March 7, 1967 R. L. POE ETAL 3,308,143
PROCESS FOR DECOMPOSING TRIALKYLALUMINUM COMPLEX
Filed Nov. 14, 1962
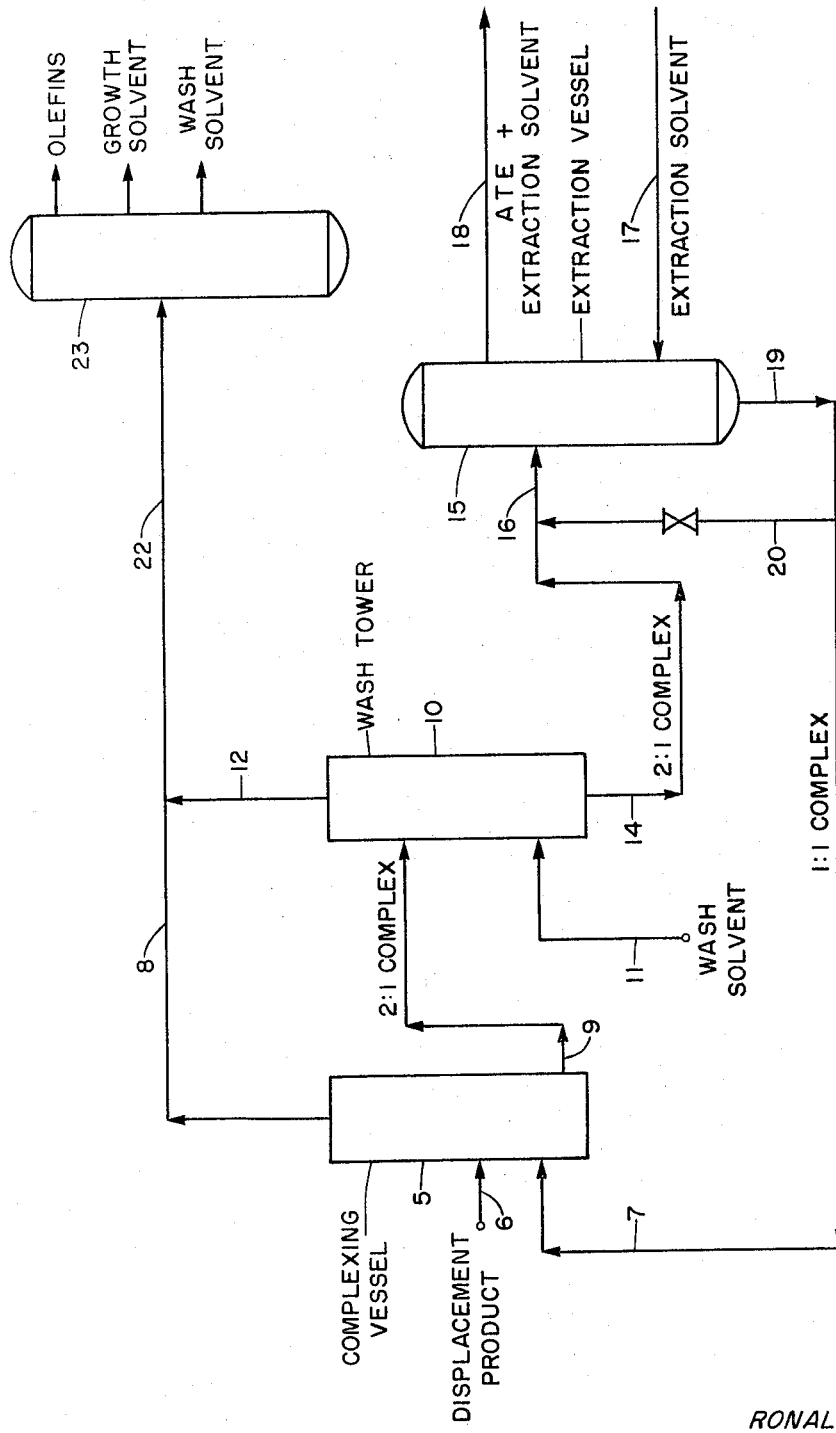
INVENTORS
RONALD L. POE
BILLY J. WILLIAMS
BY
*Henry H. Huth*
ATTORNEY United States Patent Office 3,308,143
Patented Mar. 7, 1967

3,308,143
PROCESS FOR DECOMPOSING TRIALKYL-
ALUMINUM COMPLEX
Ronald L. Poe and Billy J. Williams, Ponca City, Okla.,
assignors to Continental Oil Company, Ponca City,
Okla., a corporation of Delaware
Filed Nov. 14, 1962, Ser. No. 237,558
6 Claims. (Cl. 260—448)

This invention relates to a novel method of regenerating a complex of trialkylaluminum and a compound having the formula $R_nMX$, wherein R is alkyl; M is an element selected from the group consisting of nitrogen, arsenic, phosphorus, sulfur, selenium, and tellurium; X is halogen; and $n$ is 3 or 4, depending on the particular element M.

By means of the growth reaction, it is possible to obtain a high molecular weight trialkylaluminum which is useful as starting material for the production of high molecular weight olefins and/or high molecular weight alcohols. With respect to the production of alpha-olefins, a necessary part of the operation involves the separation of low molecular weight trialkylaluminum from the relatively high molecular weight alpha-olefins. The separation can be accomplished by contacting the mixture of alpha-olefins and low molecular weight trialkylaluminum with a compound $R_nMX$ or a 1:1 complex of trialkylaluminum and $R_nMX$. The 1:1 complex combines with the trialkylaluminum to form a 2:1 complex, both complexes being insoluble in the alpha-olefins. Because of the insolubility of the complexes in the alpha-olefins, two phases are formed which can be readily separated from each other. The 2:1 complex can be heated to an elevated temperature at which it decomposes into the 1:1 complex and trialkylaluminum. The 1:1 complex does not readily decompose and requires conditions of temperature and pressure which result in pyrolysis of the trialkylaluminum. Since it is desirable to reuse the complexing compound in the process and this material is reuseable only in the form of 1:1 complex, the aforedescribed process is ordinarily carried out by initially forming the 1:1 complex and thereafter operating the process with this complex. Accordingly, the present invention is concerned with an improved technique for the decomposition of the 2:1 complex.

Another object of this invention is to provide an efficient and economical method for the decomposition of the 2:1 complex of trialkylaluminum and $R_nMX$ into a 1:1 complex and trialkylaluminum.

Other objects and advantages of this invention will become apparent from the following description and explanation thereof.

The foregoing objects are achieved broadly by a process which comprises contacting a complex material containing a 2:1 complex of trialkylaluminum and a compound having the formula $R_nMX$, wherein R is alkyl; M is an element selected from the group consisting of nitrogen, arsenic, phosphorus, sulfur, selenium, and tellurium; X is halogen; and $n$ is 3 or 4, depending on the particular element M with an extraction solvent at a temperature and for a sufficient period of time to remove trialkylaluminum from the 2:1 complex material.

In one aspect of the invention, a 2:1 complex of trialkylaluminum in which the alkyl radicals have an average of about 2 to 5 carbon atoms and a tetraalkylammonium halide in which the alkyl radicals have an average of about 1 to 5 carbon atoms is contacted with an extraction solvent, e.g., a paraffinic hydrocarbon, at a temperature of about 135 to 200° C. and thereby decomposing the 2:1 complex into a 1:1 complex and trialkylaluminum.

By contacting the 2:1 complex with an extraction solvent such as paraffinic hydrocarbons, it becomes possible to conduct the decomposition reaction at atmospheric pressure. Without the use of the extraction solvent, it has been necessary to use a subatmospheric pressure for the decomposition reaction. This represents a significant advantage because it is costly to operate commercially a relatively high vacuum system. Another advantage in the use of the extraction solvent for the decomposition reaction is that it reduces the time of reaction needed to effect a significant conversion of the 2:1 complex into a 1:1 complex and aluminum trialkyl. The advantages to be obtained by the present invention renders the process commercially attractive.

The contacting of the 2:1 complex with an extraction solvent such as paraffinic hydrocarbon can be conducted as a batch or continuous operation. In the batch process, the extraction solvent and the 2:1 complex are held up in the pyrolysis zone for a suitable period of time in order that the desired conversion into the 1:1 complex and trialkylaluminum can take place. Thereafter, the contents of the holding vessel are removed and the products separated for the recovery of the 1:1 complex and the trialkylaluminum. In a continuous operation, the 2:1 complex can be fed into the upper part of an extraction column and permitted to flow countercurrently to the upward passage of the extraction solvent. Under the temperature conditions maintained in the extraction column, the extraction solvent extracts the trialkylaluminum from the 2:1 complex, and the two materials are yielded overhead at the top part of the column. The resultant 1:1 complex is yielded from the bottom part of the column. In the event that the extent of conversion of 2:1 complex is less than is desired, the unconverted 2:1 complex can be recycled to the upper part of the extraction column.

The complexing agent which is employed in carrying out the invention is defined by the formula $R_nMX$, wherein R is an alkyl radical; M is an element selected from the group consisting of nitrogen, arsenic, phosphorus, sulfur, selenium, and tellurium; X is a halogen; and $n$ is 3 or 4, depending on the particular element M. Preferably, the lower molecular weight alkyl radicals are employed, that is, those containing from 1 to 5 carbon atoms. As the length of the alkyl chain increases, the solubility of the complex in hydrocarbons also increases, whereby the degree of separation is reduced. Of the elements represented by M, all of which are nonmetals, the preferred material is nitrogen; however any of the other nonmetals set forth also are effective as complexing agents for carrying out the process of the invention. Any of the halogens can be employed; however the chlorides are preferred.

In order to more clearly and effectively describe the invention, the following discussion will be directed to the tetraalkylammonium halides. This is not, however, to be construed in any limited sense; and it is within the scope of the invention to employ any of the other alkyl nonmetal halides within the scope of the formula set forth above. It is further to be understood that each of the other nonmetals can be substituted for nitrogen in the specific examples of the complexing agents and complexes hereinafter set forth.

The tetraalkylammonium halide which forms part of the complex material is one in which the alkyl radicals have an average of about 1 to 5 carbon atoms. The term "average" in connection with the number of carbon atoms of the tetraalkylammonium halide and the trialkylaluminum means the total number of carbon atoms of all the alkyl radicals divided by the number of alkyl radicals. The tetraalkylammonium halide can be, for example, tetramethylammonium chloride, tetramethylammonium iodide, tetraethylammonium fluoride, tetrabutylammonium bromide, tetramethylammonium chloride, tetrabutylammonium fluoride, tetrapropylammonium iodide, tetrapropylammonium chloride, etc. The tetraalkylammonium chloride is preferred as the component of the complex, because it tends to be less soluble in hydrocarbon material to a significant extent; and in the form of the complex, it is readily decomposable into the 1:1 complex and aluminum trialkyl. Another advantage is the greater availability of the tetraalkylammonium chloride over the other halides. It is also preferred using tetramethylammonium chloride as a component of the complex because of its tendency to be less soluble in hydrocarbon materials. In terms of amount of halide to be used in preparing the complex, the tetramethylammonium halide presents an advantage which is important in commercial terms. Generally, the tetraalkylammonium halide may form complexes which are either soluble or insoluble in hydrocarbon materials. With respect to the 1:1 complex, it is preferred that it be insoluble in the extraction solvent in order that it will remain in the extract phase. It is also preferred that the 2:1 complex is insoluble in the extraction solvent for the same reasons.

The trialkylaluminum which is combined with the tetraalkylammonium halide to form the complex material, contains alkyl radicals having an average of about 2 to 5 carbon atoms. Specific examples of the trialkylaluminum are triethylaluminum, tripropylaluminum, tributylaluminum, etc. From the standpoint of solubility in hydrocarbon materials, it is preferred that the sum of the average number of carbon atoms of the alkyl radicals in trialkylaluminum and tetraalkylammonium halide is not greater than 6. When the sum of the averages of carbon atoms exceeds 6, there is a greater tendency for the complex material to be soluble in hydrocarbon materials. Specific examples of complexes which can be treated in accordance with the method of this invention are 2-triethylaluminum-tetramethylammonium chloride, 2-triethylaluminum-tetramethylammonium iodide, 2-triamylaluminum tetramethylammonium fluoride, 2-triisobutylaluminum-tetraethylammonium bromide, 2-tributylaluminum-tetraethylammonium chloride, 2-tripropylaluminum-tetramethyl-ammonium fluoride, 2-triisopropylaluminum-tetrapropylammonium fluoride, 2-tributylaluminum-tetramethylammonium iodide, 2-triisobutylaluminum-tetraethylammonium chloride, 2-triethylaluminum-tetraisobutylammonium chloride, 2-triisopropyl aluminum-tetramethylammonium chloride, and 2-tripropylaluminum-tetraisopropylammonium bromide. Specific examples of compounds of the other nonmetals which can be employed correspond to the compounds set forth above.

The 2:1 complex is readily decomposed in accordance with the process of this invention. In the decomposition reaction, the 2:1 complex is transformed into the 1:1 complex, with the release of one mole of trialkylaluminum for each mole of complex which is decomposed. The 1:1 complex does not readily decompose and requires conditions of temperature and pressure which result in pyrolysis of the trialkylaluminum. Since it is desirable to reuse the tetraalkylammonium halide in the process and this material is reuseable only in the form of the 1:1 complex, the process is ordinarily carried out by initially forming the 1:1 complex and thereafter operating the process with this complex rather than with the tetraalkylammonium halide. Accordingly, the following description and discussion are directed specifically to the use of the 1:1 complex; however it is to be understood that the uncomplexed tetraalkylammonium halide can also be employed in the various embodiments of the invention.

The 1:1 complex is prepared by combining the trialkylaluminum with the tetraalkylammonium halide and allowing the reaction to take place. The reaction is exothermic and therefore it is not necessary to supply heat to maintain the same. In some instances, it may be desirable to preheat the reactants for the purpose of initiating the reaction. The temperature of reaction is in the range of about 50 to 150° C., more usually about 50 to 100° C. At such a temperature and even outside the range given, the reaction is conducted under a pressure which can be sub-atmospheric, atmospheric or superatmospheric. Usually, the pressure of the reaction is about atmospheric. The 1:1 complex requires equal molar quantities of the trialkylaluminum and the tetraalkylammonium halide. In practice, the stoichiometric proportions or a very slight excess of the trialkylaluminum are employed in order to avoid the necessity of purifying the complex.

The 2:1 complex is readily formed by the reaction between the 1:1 complex and the low molecular weight trialkylaluminum which is described above. The reaction between the 1:1 complex and the trialkylaluminum is exothermic and therefore heating is not required to maintain the reaction. In general, the temperature at which the 2:1 complex is formed ranges from about 50 to 150° C., more usually about 50° to 100° C. The pressure of reaction may also vary widely from subatmospheric pressure, atmospheric to superatmospheric pressure. Usually the pressure of reaction is atmospheric. The time of reaction is relatively short but may vary from about 0.25 to about 30 minutes.

As previously indicated, the 1:1 complex is used for the separation of trialkylaluminum from a mixture also containing alpha-olefins. The mixture of trialkylaluminum and alpha-olefins is obtained from the displacement reaction involving a growth product. For a better understanding of how the present invention is utilized, a description will be provide below of the growth reaction and the subsequent displacement reaction.

The growth reaction involves the reaction between a low molecular weight mono-olefin or alkylene, such as ethylene, propylene, butene, etc., with a low molecular weight trialkylaluminum, such as, for example, trialkylaluminum having the alkyl substituents containing from about 2 to 4 carbon atoms. The resultant growth product comprises a trialkyl compound in which the alkyl groups vary widely in molecular weight. The growth reaction can be illustrated by the following equation:

$$\text{Al}\begin{matrix}\diagup\text{CH}_2\text{CH}_3\\ -\text{CH}_2\text{CH}_3 \\ \diagdown\text{CH}_2\text{CH}_3\end{matrix} + n\text{CH}_2=\text{CH}_2 \longrightarrow \text{Al}\begin{matrix}\diagup(\text{CH}_2\text{CH}_2)_x\text{CH}_2\text{CH}_3\\ -(\text{CH}_2\text{CH}_2)_y\text{CH}_2\text{CH}_3\\ \diagdown(\text{CH}_2\text{CH}_2)_z\text{CH}_2\text{CH}_3\end{matrix}$$

wherein $x$, $y$, and $z$ represent integers ranging from 0 to about 14 and $x+y+z$ is equal to small $n$. The growth reaction can be carried out by passing the mono-olefin such as ethylene through trialkylaluminum such as triethylaluminum, preferably in the presence of a diluent under a variety of reaction conditions. The temperature of reaction can be from about 65° to 150° C. and at a pressure of about 200 to 5,000 p.s.i.g., and more usually a temperature of about 90° to 120° C. and at a pressure of about 1,000 to 3,500 p.s.i.g.

The growth reaction provides a statistical distribution of alkyl chain lengths characterized by the Poisson relationship which can be pressed as follows:

$$P_{(n)} = \frac{m^n e^{-m}}{n!}$$

wherein $P_{(n)}$ represents the probability that a certain hydrocarbon radical will be formed by n additions of ethylene to the aluminum ethyl bond originally present, and m is the mean number of additions of ethylene per growing chain. The following table contains an illustration of a type of distribution which is obtained in the growth reaction:

*Table*

| Alkyl group: | Weight, percent |
|---|---|
| $C_2$ | 0.04 |
| $C_4$ | 0.23 |
| $C_6$ | 3.37 |
| $C_8$ | 11.79 |
| $C_{10}$ | 20.42 |
| $C_{12}$ | 22.63 |
| $C_{14}$ | 18.20 |
| $C_{16}$ | 11.61 |
| $C_{18}$ | 6.21 |
| $C_{20}$ | 3.47 |
| $C_{22}$ | 1.25 |
| $C_{24}$ | 0.49 |
| $C_{26}$ | 0.18 |
| $C_{28}$ | 0.05 |

The growth reaction may be carried out in a diluent which can be a paraffin, cycloparaffin, or aromatic hydrocarbon such as, for example, isooctane, cyclohexane, benzene, xylene, kerosene, alkylate, naphtha, and the like. The diluent aids in controlling the temperature of the reaction which is exothermic and also serves as a solvent for the growth product. The diluent employed in the growth reaction can also be the alpha-olefin which was described hereinabove.

The growth product has alkyl substituents containing about 2 to 40 carbon atoms or higher. It is subjected to a displacement reaction with a low molecular weight mono-olefin containing about 2 to 4 carbon atoms. The low molecular mono-olefins may be, for example, ethylene, propylene, or butene. In the displacement reaction, the mono-olefin is substituted for the high molecular weight alkyl substituents of the aluminum compound. As a consequence, the displacement reaction product comprises a low molecular weight trialkyl in which the alkyl substituents contain about 2 to 4 carbon atoms and alpha-olefins contain about 2 to 40 carbon atoms or higher.

The displacement reaction can be effected in the absence of catalyst by the atomization technique. In such a method, the feed is atomized through well-known means as it is introduced into the displacement reaction zone. The temperature is maintained below about 370° C., more usually between about 40° C. and about 370° C., preferably between about 200° C. and about 300° C. The reaction pressure is maintained below about 200 p.s.i.a. and can be in the subatmospheric range, for example, as low as 1 p.s.i.a. Preferably, the pressure of the reaction varies between about 20 and about 100 p.s.i.a. The time of the reaction may be from about 30 seconds to about 15 minutes, more usually about 1 minute to about 10 minutes, and preferably from about 3 minutes to about 7 minutes.

With regard to the means of spraying the aluminum alkyls, various techniques can be employed. For example, the conventional hollow cone nozzles can be employed and atomization is obtained by maintaining a pressure differential across the nozzle. In some instances, the atomization of aluminum alkyl is aided by the use of an atomizing gas, which for the purpose of the present invention can be the alkylene, which is employed in the displacement reaction. Introducing the aluminum alkyls at an elevated temperature is desirable because of the reduction in viscosity. In general, the aluminum alkyls are preheated to a temperature below the reaction temperature, for example, up to about 340° C. Prior to atomization, preheating of the aluminum alkyls is preferably carried out to provide a temperature of about 90° C. to 160° C.

In a noncatalytic operation where the feed to the displacement reaction is not atomized, it is preferred to employ a temperature of about 200° C. to 320° C. for the displacement reaction. The displacement reaction would then preferably be conducted at a pressure of about 150 to 300 p.s.i.g., and the time of reaction could vary from about 0.1 to 10 seconds.

The displacement reaction can also be effected in the presence of a catalyst. For this purpose, it is preferred that the temperature of reaction vary from about 50° to 150° C. and at a pressure of about 150 to 1,000 p.s.i.g. The time of reaction may be from about 1 to 30 minutes. A suitable catalyst for use in the reaction may include any one of the so-called reduction catalysts, such as nickel, cobalt, palladium and iron compounds. The preferred catalyst is a nickel compound which will react with the aluminum trialkyl compound. Specific nickel catalysts include finely divided metallic nickel, Raney nickel, nickel acetyl-acetonate, nickel naphthanate, etc. The amount of catalyst employed in the reaction can be varied greatly, however, usually about 0.001 to 0.1 percent, based on the weight of the growth product, are employed.

In the displacement reaction, the quantity of low molecular weight mono-olefin or alkylene employed is governed to affect complete replacement of the alkyl substituents in the high molecular weight alkyl aluminum. Accordingly, a stoichiometric amount of the low molecular weight mono-olefin can be used; however it is preferred to employ a stoichiometric excess of about 200 to 2,000 mole percent of the low molecular weight mono-olefin per mole of growth product for thermal displacement and about 10 to 100 mole percent for catalytic displacement.

The displacement product described above is contacted with a 1:1 complex in order that the trialkylaluminum present therein reacts to form the 2:1 complex. The resultant reaction mixture is composed of two phases, the upper phase containing substantially all the alpha-olefins and the lower phase comprising the complex material, including the 2:1 complex and some alpha-olefins. In treating the alpha-olefins with the 1:1 complex, it is preferred to use an excess of the 1:1 complex above the stoichiometric amount needed to react with all of the trialkylaluminum which is present in the displacement product. Generally, about 5 to 10 percent molar excess of 1:1 complex is employed in the treatment of the displacement product.

The complex material containing the 2:1 complex may be contaminated with alpha-olefins. The contamination can be readily eliminated by treating the complex material with a paraffinic hydrocarbon. The paraffinic hydrocarbon may contain from about 5 to 12 carbon atoms. Specific examples of the paraffinic hydrocarbon are pentane, hexane, heptane, octane, nonane, etc. About 0.1 to 2.0 volumes of paraffinic hydrocarbon per unit volume of complex materal are employed for the washing step. Generally, the complex material may contain from about 2 to 5 percent of alpha-olefins as contaminating material prior to being washed with the paraffinic hydrocarbon. The washing step can be conducted at a temperature of about 5° to 100° C. The pressure of the washing step may be subatmospheric, atmospheric, or superatmospheric just so long as the materials remain liquid during the washing procedure and substantially no decomposition of complex material occurs.

The complex material containing the 2:1 complex is subjected to a heat treatment in the presence of an extraction solvent. The temperature of the decomposition reaction can be maintained at about 100 to 200° C., more usually about 150 to 175° C. The pressure under which the decomposition of the 2:1 complex occurs can be varied widely within the scope of the present invention. For this purpose, the pressure can be subatmospheric, atmospheric or superatmospheric; however usually it is about atmospheric. As previously indicated, one of the advantages of the regeneration process of this invention is that it can occur at or above atmospheric pressure, thus eliminating the costly procedure of maintaining a vacuum in the decomposition zone. The residence time of the 2:1 complex in the decomposition zone is about 1 to 60 minutes, more usually about 5 to 15 minutes. The extraction solvent accelerates the decomposition of the 2:1 complex into the 1:1 complex and trialkylaluminum. The quantity of the extraction solvent in the extraction zone may vary widely. Generally about 1 to 40 volumes of extraction solvent are used per unit volume of complex material; however more usually about 2 to 10 volumes of extraction solvent per unit volume of complex material are employed.

The paraffinic hydrocarbon to be used as an extraction solvent in the decomposition reaction of the 2:1 complex has a boiling point which is greater than the temperature at which the decomposition reaction occurs. The extraction takes place in the liquid phase; and the trialkylaluminum enters into solution with the extraction solvent, whereas the resultant 1:1 complex is preferentially soluble in the 2:1 complex or it forms an insoluble phase. Specific examples of paraffinic hydrocarbons which can be used as extraction solvents are nonane, cyclohexane, decane, dodecane, tetradecane, methylcyclopentane, methylcyclohexane, hexadecane, etc. Other types of compounds can be used as extraction solvents, including, for example, unsaturated hydrocarbons, such as, nonene, decene, octene, cyclohexene, and similar mono-olefins corresponding generally to the paraffinic hydrocarbons which can be employed. In addition, the unsaturated hydrocarbon solvents include the diolefin hydrocarbons, such as hexadiene, heptadiene, octadiene, and the like. While many of the paraffinic and unsaturated hydrocarbons of suitable boiling point can be employed as extraction solvents, generally the solvents contain from about 4 to about 20 carbon atoms and more usually from about 8 to about 20 carbon atoms.

The extraction solvent is selected on the basis of being soluble with the trialkylaluminum that is formed from the decomposition of the 2:1 complex. It is preferred to use an extraction solvent that can be utilized in the growth reaction. For this purpose, the paraffinic hydrocarbons are especially suitable, particularly the petroleum fractions boiling in the naphtha and kerosene range. The petroleum and kerosene fractions may have an A.S.T.M. initial boiling point of 120 to 140° C. and an end point of about 200 to 250° C. The raffinate of the extraction process which contains the trialkylaluminum and the extraction solvent may be wholly or in part passed to the growth reaction. In some instances, a portion of the extraction solvent can be removed from the raffinate prior to being passed to the growth reactor.

Laboratory experiments were conducted in order to determine effectiveness of aliphatic hydrocarbons as extraction solvents for the regeneration of 1:1 complexes from the 2:1 complex.

*Example 1*

31 grams of a 2:1 complex of triethylaluminum and tetramethylammonium chloride in which the aluminum-to-chloride ratio was 1.94 were charged to a round bottomed flask free of moisture and air. 10 mls. of n-dodecane were added to the complex material, and the resultant mixture was heated to 150° C. The mixture was stirred, and 5-ml. samples of the dodecane layer were taken periodically at 15-minute intervals. After each sample was taken, 5 ml. of fresh dodecane were added to the mixture. At the end of 45 minutes, it was found that 9.6 percent of the triethylaluminum had been extracted.

*Example 2*

The experiment of Example 1 was repeated except that the extraction temperature was 175° C. instead of 150° C., and also the extraction solvent was n-tetradecane. At the end of 45 minutes, it was found that 17 percent of the triethylaluminum had been extracted from the 2:1 complex material.

To provide a fuller understanding of the present invention, reference will be had to the acompanying drawing which forms a part of this specification and contains a schematic diagram of a system which utilizes the present invention.

A displacement product which originally utilized a growth product having an $m$ value of 4.0 and containing about 20 percent of triethylaluminum, 20 percent kerosene growth solvent, and 60 percent alpha-olefins ranging in compounds having 4 to 26 carbon atoms is charged to a complexing vessel 5 by means of line 6 at the rate of 140 pounds per hour. A 1:1 complex of triethylaluminum and tetramethylammonium chloride is charged to the complexing vessel 5 by means of line 7 at the rate of 61 pounds per hour. The displacement product and the 1:1 complex are fed to the complexing vessel 5 at about the middle part thereof so that the displacement product substantially free of triethylaluminum can be yielded overhead through line 8, and the insoluble phase of complex material is yielded from the bottom of the complexing vessel 5 by means of line 9. The alpha-olefin phase is discharged overhead from the complexing vessel 5 at the rate of 107 pounds per hour, whereas the complex material is yielded from the bottom of the vessel 5 at the rate of 94 pounds per hour. The temperature in the complexing vessel 5 is maintained at about 60° C. under a pressure of about atmospheric. The displacement product has a residence time of about 15 minutes before it is discharged as the overhead product in line 8.

The complex material which leaves the bottom of the complexing vessel 5 enters the upper part of a wash tower 10. A wash solvent such as n-hexane is fed to the bottom part of the wash tower 10 by means of line 11 at the rate of 45 pounds per hour. The wash solvent flows upwardly in countercurrent contact with the complex material and removes from the latter any alpha-olefins and kerosene contained in in. The complex material entering the wash tower contains about 5 percent alpha-olefins and kerosene which are easily removed therefrom by means of the wash solvent. The wash solvent enriched with alpha-olefins and kerosene is yielded from the top of the wash tower 10 by means of line 12, whereas the complex material denuded of alpha-olefins and kerosene is discharged from the bottom of wash tower through line 14. The enriched stream of wash solvent in line 12 contains about 10 percent of alpha-olefins and kerosene which have been extracted from the complex material. The temperature in the wash tower is maintained at about 60° C. and under a pressure of about atmospheric.

The washed complex material in line 14 is fed to the upper part of an extraction vessel 15 by means of line 16. An extraction solvent such as hexadecane is fed to the bottom part of the extraction vessel 15 by means of line 17 at the rate of 300 pounds per hour. The complex material flows downwardly in countercurrent contact with the extraction solvent and thereby the triethylaluminum is removed from the complex material. The extraction solvent enriched with triethylaluminum leaves the upper part of the vessel 15 by means of line 18 at the rate of 322 pounds per hour. The complex material from which the triethylaluminum is removed leaves the bottom of the vessel 15 by means of line 19 at the rate of 72 pounds per hour. The regenerated complex material contains about 68 percent of 1:1 complex. In some operations, it may be desirable to recycle a portion of the complex material leaving the bottom of the extraction recycle ratio, measured as the volumes of recycled complex material in line 20 joins the fresh complex material in line 14, and the combined stream flows through line 16 into the upper part of the extraction vessel 15. A recycle ratio, measured as the volume of recycled complex material per volume of fresh complex material being fed to the extraction vessel, of about 0.2 to 10.0:1 may be used in the regeneration or extraction process. In vessel 15, the temperature is maintained at about 160° C. and under a pressure of about atmospheric. The complex material has a residence time of about 10 minutes in the extraction vessel. The regeneration complex material in line 19 flows into line 7 and is therefore recycled to the complexing vessel 5.

The overhead products from complexing vessel 5 and wash tower 10 which are in lines 8 and 12, respectively, come together and flow through line 22 before entering a fractionation system 23. In the fractionation system 23, which is operated by conventional means, the alpha-olefins, the growth solvent employed in the growth reaction, and the wash solvent are separated from each other. The wash solvent stream is then recycled to wash tower 10, with or without make-up material, and the growth solvent is reused in the growth reactor (not shown).

Having thus described the invention by providing specific examples thereof, it is to be understood that no undue limitations or restrictions are to be drawn by reason thereof and that many variations and modifications are within the scope of the invention.

What is claimed is:

1. A process for decomposing a complex material containing a 2:1 complex of a trialkylaluminum in which the alkyl radicals contain an average of about 2 to 5 carbon atoms and a compound having the formula $R_nMX$, wherein R is an alkyl radical containing an average of about 1 to 5 carbon atoms; M is an element selected from the group consisting of nitrogen, arsenic, phosphorus, sulfur, selenium, and tellurium; X is a halogen; and $n$ varies from 3 to 4, depending on the particular element M, which comprises contacting said complex with a hydrocarbon liquid for a period of time sufficient to remove trialkylaluminum from the 2:1 complex material and at a temperature between 100 and 200° C. sufficient to remove trialkylaluminum from said 2:1 complex material but less than the boiling point of said hydrocarbon liquid at a pressure sufficient to maintain the hydrocarbon in the liquid phase.

2. A process which comprises contacting a complex material containing a 2:1 complex of a trialkylaluminum in which the alkyl radicals contain an average of about 2 to 5 carbon atoms and a tetraalkylammonium halide in which the alkyl radicals contain an average of about 1 to 5 carbon atoms with a nonreactive insoluble extraction solvent, at a temperature of about 100 to 200° C., at a pressure sufficient to maintain the extraction solvent in the liquid phase and for a period of about 1 to 60 minutes to remove trialkylaluminum from the 2:1 complex material.

3. The process of claim 2 wherein the tetraalkylammonium halide is tetraalkylammonium chloride.

4. A process which comprises passing a complex material containing a 2:1 complex of trialkylaluminum in which the alkyl radicals contain an average of about 2 to 5 carbon atoms and a tetraalkylammonium halide in which the alkyl radicals contain an average of about 1 to 5 carbon atoms to the upper part of an elongated extraction zone, passing a nonreactive insoluble extraction solvent to the lower part of the extraction zone, thereby the extraction solvent passes upwardly in countercurrent flow to the complex material, maintaining the extraction zone at a temperature of about 100 to 200° C., at a pressure of about atmospheric to maintain the extraction solvent in the liquid phase, the complex material having a residence time of about 1 to 60 minutes in the extraction zone, withdrawing the extraction solvent enriched with trialkylaluminum from the upper part of the extraction zone and withdrawing complex material enriched with 1:1 complex material from the bottom part of the extraction zone.

5. The process of claim 4 wherein the complex material enriched with 1:1 complex leaving the extraction zone is divided so that a portion thereof is recycled to the extraction zone at a recycle rate of about 0.2 to 10.0:1.

6. The process of claim 4 wherein the trialkylaluminum is triethylaluminum and the tetraalkylammonium halide is tetramethylammonium chloride.

References Cited by the Examiner

UNITED STATES PATENTS

| 3,153,075 | 10/1964 | Kroll | 260—448 |
| 3,206,522 | 9/1965 | Poe et al. | 260—448 |

OTHER REFERENCES

Translation of article by Mario Farina, Gazzeta Chemica Italiana 89 (1959), p. 4 of translation.

HELEN M. McCARTHY, *Primary Examiner.*

TOBIAS E. LEVOW, *Examiner.*

H. M. SNEED, *Assistant Examiner.*